March 14, 1944. W. H. TANKE 2,344,474
TWO-WAY PLOW
Filed Feb. 8, 1941 5 Sheets-Sheet 1

Fig. 1

Inventor
W. H. Tanke
by
Attorney

March 14, 1944. W. H. TANKE 2,344,474
TWO-WAY PLOW
Filed Feb. 8, 1941 5 Sheets-Sheet 4

Fig. 4
Fig. 6

Inventor
W. H. Tanke
by
Attorney

March 14, 1944. W. H. TANKE 2,344,474
TWO-WAY PLOW
Filed Feb. 8, 1941 5 Sheets-Sheet 5

Fig. 5

Inventor
W. H. Tanke
by
Attorney

Patented Mar. 14, 1944

2,344,474

UNITED STATES PATENT OFFICE 2,344,474

TWO-WAY PLOW

Willard H. Tanke, La Crosse, Wis., assignor to Allis-Chalmers Manufacturing Company, Milwaukee, Wis., a corporation of Delaware Application February 8, 1941, Serial No. 377,963

6 Claims. (Cl. 97—47)

This invention relates to plows and it is primarily concerned with that class of plows known as two-way plows having oppositely disposed plow bottoms adapted for alternate operation.

It is an object of the invention to provide an improved lifting mechanism for a plow, which will, during the raising of the plow, shift the plow laterally from its line of draft with the tractor and which, upon lowering of the plow, will permit it to return to a working position on its line of draft with the tractor.

A further object of the invention is to provide an improved lifting mechanism for a plow which will prevent the plow bottom from swinging inwardly toward its line of draft with the tractor, when it is raised to inoperative or transport position. In a two-way plow the maintenance of the inoperative plow bottom in a raised or transport position laterally of its line of draft with the tractor permits the free and unobstructed operation of the operative or working plow and eliminates interference between the two plow structures.

A further object of the invention is to provide an improved lifting mechanism for a plow which will hold the plow, when in a raised or transport position, in a laterally shifted position relative to the tractor so as to permit the free and unobstructed operation of the tractor's rotary power takeoff mechanism.

A further object of the invention is to provide an improved lifting mechanism for a plow which allows relatively free lateral movement of the plow relative to the tractor when in working position and restricted lateral movement of the plow when raised to a transport position.

A still further object of the invention is to provide a mechanism for shifting a plow laterally of its line of draft with a tractor during the raising of the plow, which mechanism is simple in construction, durable in use, and cheap to manufacture.

Figure 1:
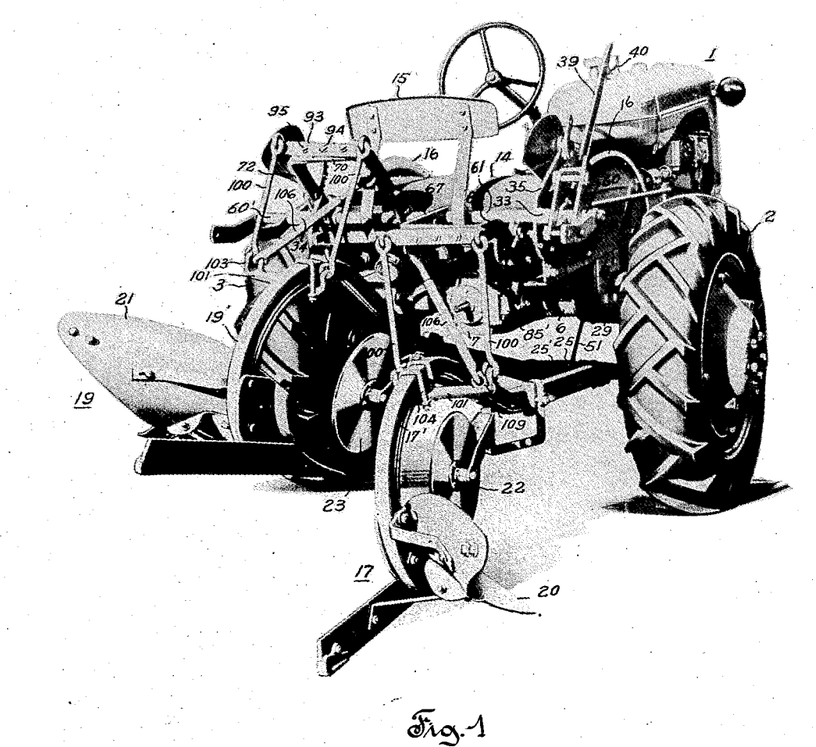
Fig. 1 is a perspective three-quarter rear view of a tractor operated two-way plow with a right hand plow in ground entering position and a left hand plow in raised or transport position.

The foregoing and other objects and advantages of the invention and the operation of a device constructed in accordance therewith will be apparent from the following description of a preferred embodiment of the invention. Referring to the accompanying drawings forming part of this specification and in which like reference characters designate the same or similar parts in the various views:

Fig. 1 shows a tractor operated plow comprising a conventional wheel type farm tractor, which constitutes a traveling support, and a two-way plow attachment mounted thereon for plowing a field in the usual manner.

The body of the tractor is generally indicated by the reference character 1 and is supported at its front end by a steering truck and associated closely spaced front wheels, not shown, and at its rear end by a pair of transversely spaced rear wheels, the right rear wheel being designated by the character 2 and the left rear wheel by the character 3.

The body of the tractor comprises an engine, torque tube 5, and a rear axle structure 6 upon which the rear wheels 2 and 3 are mounted. As is usual in farm tractors of the wheel type the rear axle structure is of considerable transverse width so as to accommodate in the space between the rear wheels the structures of the various implement attachments, such as a two-way plow, that may be connected to the tractor.

The rear axle structure 6 has, spaced on each side of its central portion 7, upwardly extending bosses 8 having horizontal supporting surfaces adapted to retain forwardly and rearwardly extending angle members 9 disposed longitudinally of the tractor, and at each side thereof. The angle members 9, together with associated transverse members 10 and 11, only the forward one of which is shown in solid lines in Fig. 5, form a frame, generally indicated by the reference character 13, at the rear of the tractor 1, which not only serves as a means for mounting a seat 14, back rest 15, and a pair of fenders 16, but also acts as a supporting structure for a two-way plow attachment. The two-way plow attachment has a right hand and a left hand 17 and 19, respectively, the right hand plow 17 comprising a forwardly extending tool support in the form of a plow beam 17', to the rear end of which is rigidly secured a right hand plow bottom 20, and the left hand plow 19 comprising a forwardly extending tool support or plow beam 19', to the rear end of which is rigidly secured a left hand plow bottom 21. Colters 22 and 23 are movably fastened respectively to the right hand and left hand plows 17 and 19. The plow beams 17' and 19' are universally connected to the tractor at their forward ends, a suitable structure to afford hitch points for the plow beams comprising a hitch bail 25, a fixed transverse shaft 25' on the hitch bail and a pair of rearwardly extending arms 26 which are pivotally connected to depending brackets 28 secured to the final drive housings 29 of the rear axle structure 6, the connection being made by means of pivot pins 27, as best shown in Fig. 4.

Figure 5:
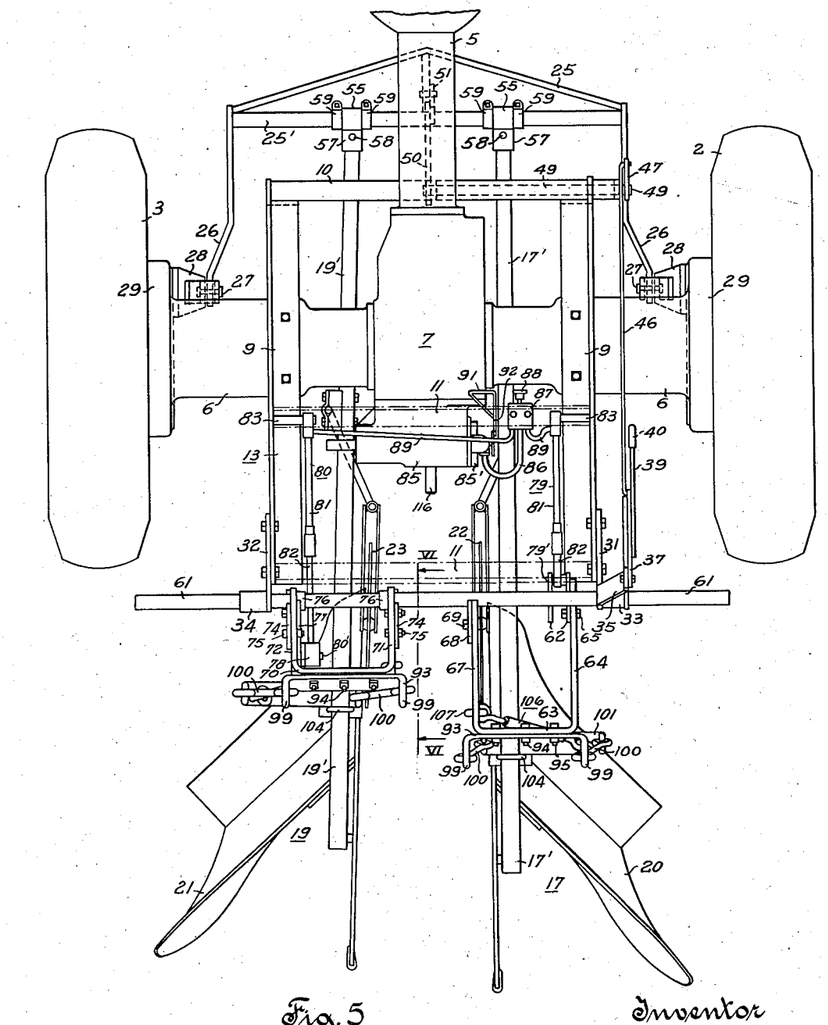
Fig. 5 is a top view of the tractor operated two-way plow showing the rear of the tractor only and having part of the tractor omitted to expose details of the plow attachment.

The frame 13, as shown in Fig. 5, has at its rear a pair of arcuate brackets 31 and 32 on which outwardly disposed bearing sleeves 33 and 34 are formed integrally with the central portions of the brackets, respectively, the right hand bracket having an upwardly and forwardly extending arm 35. The base of each bracket is bolted at fore and aft spaced points to the upwardly extending flanges of the angle members 9 at the respective sides of the tractor.

The arcuate brackets 31 and 32 not only serve as a base for a dual lifting mechanism for the plows 17 and 19, but the arm 35 of the right hand one also acts as a support for the operating lever of the hitch bail vertical adjusting mechanism. Pivotally connected to the arm 35 of the right hand arcuate bracket 31 is a bell crank lever 37 comprising a short portion 38, and a hand lever portion 39 welded thereto near the former's center and extending substantially at right angles thereof. The hand lever 39 is equipped with the usual detent mechanism comprising a grip 40, latch rod 41, and latch 43, the latter being pivotally connected with the forward half of the short portion 38 of the bell crank lever at 42 and engaging with a forwardly extending toothed segment 44 securely attached to the arcuate bracket 31. A spring 45 connected at one end to the arm 35 of the bracket and at the other end to the latch 43 retains the latter in engagement with the toothed segment 44 and holds the hand lever 39 in any predetermined position.

Figures 4, 6:
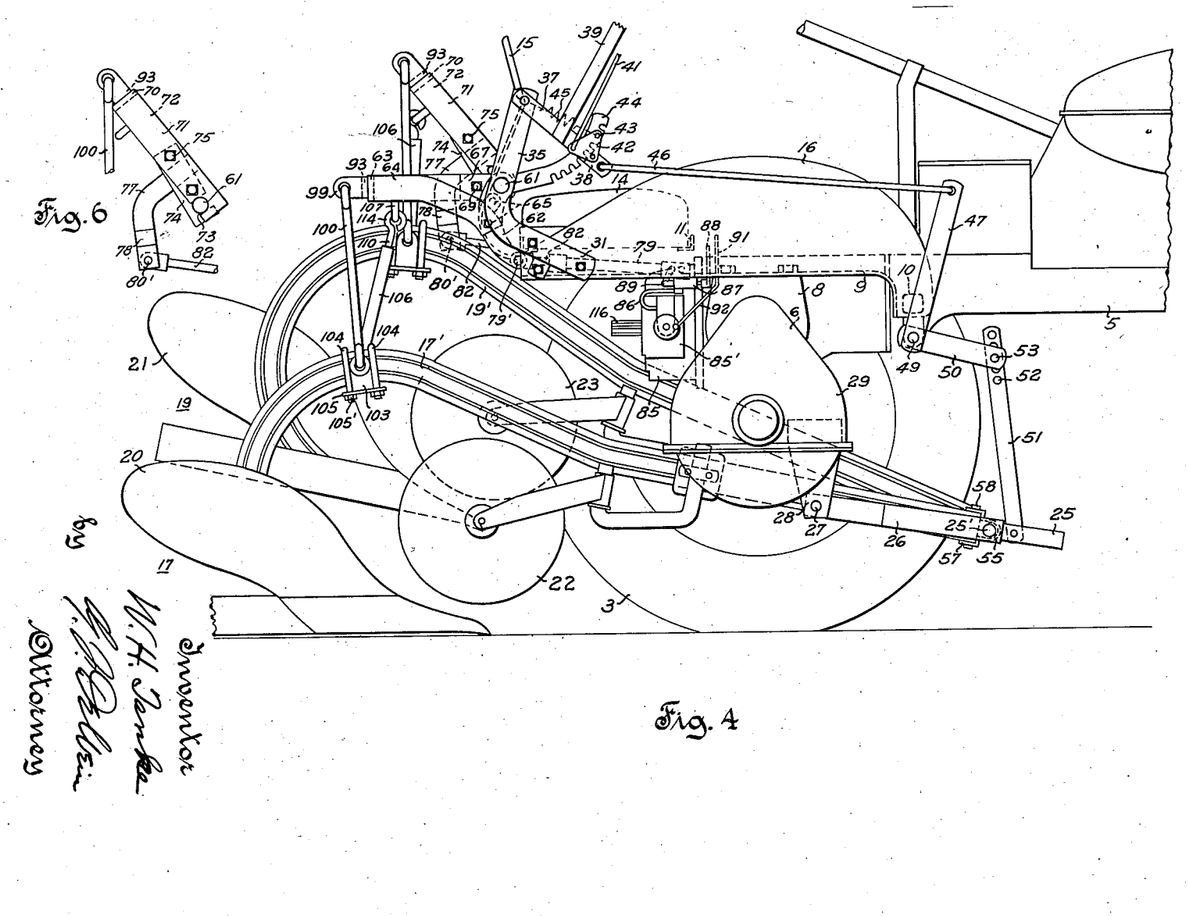
Fig. 4 is a side view of the tractor operated two-way plow, the view being taken from the right hand side of the tractor and showing the rear portion of the tractor only, part of the latter being cut away to expose details of the plow attachment. The plows are in the same relative position as shown in Fig. 1.
Fig. 6 is a detail view of the left hand lifting bail taken on line VI—VI in Fig. 5.

The bell crank lever 37 is connected to the hitch bail 25 through a series of linkages, as shown in Fig. 4, comprising a link 46 which is pivotally connected at its rear end to the forward half of the bell crank lever's short portion 38, and extends longitudinally of the tractor in the space intermediate the right hand fender 16 and right rear wheel 2. The forward end of the link 46 is pivotally connected to the end of an arm 47 which extends upwardly from a short transverse rock shaft 49 and is rigidly secured thereto, the shaft being suspended beneath the front member 10 of the tractor frame. Transversely spaced from the first arm 47 is a forwardly extending second arm 50 rigidly secured to the rock shaft 49 and having a pivotal connection at its outer end with a downwardly extending link 51. As shown in Fig. 4, the link 51 has a series of vertically spaced holes 52 at its upper end by which it is vertically adjustable about its pin connection 53 with the outwardly extending second arm 50. The lower end of the depending link 51 is pivotally connected to a central portion of the hitch bail 25. When the hand lever 39 is rocked to and fro longitudinally of the tractor, the hitch bail 25 is raised and lowered vertically about its pivotal connection 27 with the depending brackets 28 mounted on the drive housings 29 of the rear axle structure 6. The two oppositely disposed plows 17 and 19 have the forward ends of their plow beams 17' and 19' pivotally connected to the hitch bail 25 so that upward and downward movement of the bail will correspondingly raise or lower the forward end of the plow beams 17' and 19', thereby adjusting the depth of cut of the working plow.

Referring to Fig. 5, the forward ends of the plow beams 17' and 19' being identical, the description of the connection of the right hand one 17' with the hitch bail 25 will suffice to describe the connection of the left hand beam 19' with the same hitch bail. The connection of the plow beam 17' to the hitch bail comprises a U-shaped strap 55 passing around and engaging with the fixed transverse shaft 25', the ends of the strap extending rearwardly and horizontally to form a bracket 57 in which the forward end of the beam 17' is movably connected by means of a vertically disposed pivot pin 58 passing through the bracket 57 and the beam. The pivotal connection thus formed permits the plow beam 17' to be freely swung about the pivot pin 58 laterally of the tractor. The cross-sectional area of the space enclosed by the U-shaped strap 55 is appreciably larger than the cross-sectional area of the fixed shaft 25', so that the plow beam 17' may have a limited twisting movement about its own longitudinal axis. Such movement permits the plow 17 to be leveled or winged when cutting furrows of appreciable depth, or when working along the side of a slope where the tractor is subject to tilting. Fastened to the fixed shaft 25' on each side of the U-shaped connecting strap 55 are adjustably movable collars 59 which prevent the point of connection of the plow beam 17' from being shifted laterally during operation of the plow 17.

Figure 2:
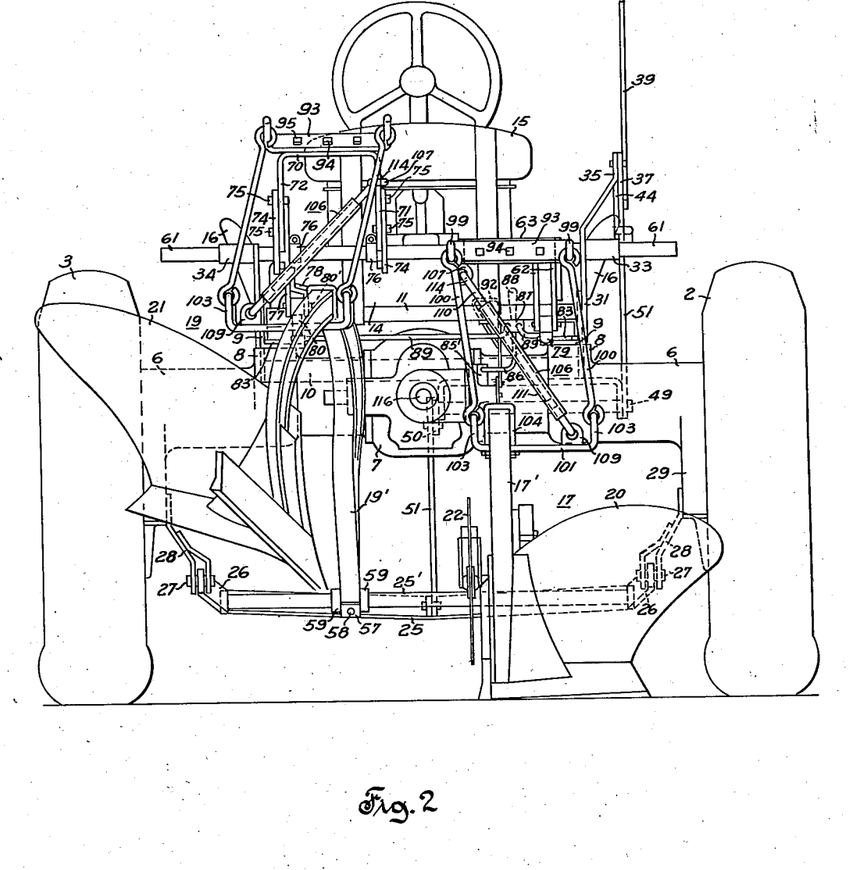
Fig. 2 is a rear view of the machine shown in Fig. 1.

The dual lifting mechanism for raising and lowering the plows 17 and 19 is mounted on the rear of the tractor frame 13 and comprises a rock shaft 61 which extends transversely of the tractor and beyond the limits of the tractor frame, as shown in Fig. 2. The rock shaft 61 is journaled in the bearing sleeves 33 and 34 which form part of the arcuate brackets 31 and 32 and is freely rotatable therein. Mounted on the outer ends of the rock shaft 61 are sleeves 60 and 60' respectively equipped with a pair of arms of unequal length, as shown in Fig. 1, which form no part of this invention and are omitted in the other views for the sake of clarity. The sleeves 60 and 60' are non-rotatably secured to the shaft 61 in axially fixed positions and abut the bearing sleeves 33 and 34, respectively, for preventing axial displacement of the shaft 61 relative to the tractor.

Securely attached to the rock shaft near the right hand bearing sleeve 33, and within the space delineated by the two arcuate brackets 31 and 32, are a pair of depending, closely spaced, arcuate arms 62, as shown in Figs. 2 and 4. The curvature of the depending arms 62, being directed downwardly and forwardly relative to the tractor from their point of origin with the shaft 61, causes the ends of these arms to describe an arc when the shaft is rotated, whose trace lies for a portion of its distance beneath the shaft.

Detachably secured to the right hand portion of the rock shaft 61, at right angles thereto, is a bail 63 having its outer leg 64 rigidly fastened by means of bolts 65 to the exterior surface of the outer depending arm 62, and its inner leg 67 connected to a short arm 68 secured to the shaft in axially spaced relation to the outer depending arm 62, as shown in Fig. 5. The inner leg 67 is bolted to the short arm 68, and has a concave recess at its end adapted to engage the convex surface of the shaft 61. Thus, only one bolt 69 is needed in the latter connection to secure the leg 67 to the shaft 61, the curvature of the engaging surfaces coacting to retain the leg in position relative to the shaft. When so mounted, the bail 63 and shaft 61 form an integral unit and any oscillatory movement imparted to the shaft will result in an upward or downward movement of the bail about the axis of the shaft as a center.

Referring to Fig. 5, a second bail 70 is detachably fastened to the left hand portion of the rock shaft 61 and extends radially therefrom for upward and downward movement about the axis of the shaft as a center. It should be particularly noted that the second or left hand bail 70 hinges on the shaft 61 so as to be freely movable relative thereto and that any oscillatory movement of the shaft is entirely independent of movement of the bail. Correspondingly the left hand bail 70 may be rotated about the rock shaft 61 without causing any movement of the latter.

The legs 71 and 72 of the second bail 70 are notched at the lower side near their ends, as shown in Fig. 6; a notch 73 engaging with the shaft and movably retaining the bail thereon. A locking plate 74, similarly notched, is securely fastened to each of the bail legs 71 and 72 by bolts 75, the notch of the locking plate engaging with the shaft 61 in opposition to the notch 73 in the bail leg, so that the aperture thus constructed has a complete periphery and forms a suitable bearing for the bail 70 on which it is rotatable about the shaft. Secured to the rock shaft 61 on the inner sides of the left hand bail legs 71 and 72 are collars 76 which act as stops to prevent any transverse movement of the bail 70 along the shaft.

The outer leg 72 of the left hand lifting bail 70 has rigidly secured to its inner surface, by welding, a downwardly and forwardly extending arcuate arm 77, as shown in Fig. 6, which is similar to one of the pair of depending arms 62 affixed to the right hand portion of the rock shaft 61. A second arm 78, at the inner side of the arm 77 has an upper portion welded to the first arm 77 at a short distance from the lower end of the latter, the two arms forming a fork.

In order to elevate or depress the right hand and left hand lifting bails 63 and 70, a pair of hydraulic rams 79 and 80 are respectively mounted beneath the tractor frame 13 on each of the angle members 9 and to the rear of the rear axle structure 6, as best shown in Fig. 5. The rams 79 and 80 lie parallel to the angle members 9 and extend rearwardly relative to the tractor. Each of the rams comprises a cylinder 81 and a movable piston 82, the former being pivotally connected at one end thereof with an inwardly extending pin 83 mounted on the base of the angle member 9, and the latter having connection respectively with its associated lifting bail. The piston 82 of the right hand ram 79 is pivotally connected by means of a pivot pin 79' with the bracket formed by the arms 62 and has its end lying in the space between the ends of the depending arms 62. Actuation of the piston 82 of the right hand ram 79 for to and fro movement within the cylinder 81 causes the ends of the depending arms 62 to swing from one side of a vertical plane through the axis of the shaft 61 to the other, and to oscillate the right hand bail 63 and the shaft 61 about the axis of the latter. The piston 82 of the left hand ram 80 is pivotally connected by means of a pivot pin 80' to the fork formed on the depending arm 77 of the left hand bail 70 whereby reciprocal motion of the piston within its cylinder 81 causes oscillatory motion of the bail 70.

In order to supply fluid pressure for the hydraulic rams 79 and 80, a service pump is located in a power take-off housing 85, attached to the rear axle structure 6, which housing encloses a suitable mechanism drivingly connected with the tractor engine for driving the pump. The pump is provided with a primary valve 85' adapted for "on," "off" or "drain" positions, the valve being operable from the driver's seat 14 by means of the rod 92 connected with the valve mechanism. Inasmuch as the two rams 79 and 80 are operated independently, a secondary or control valve 87 is interposed between the primary valve 85' and the rams, and is mounted beneath the frame 13 adjacent the forward portion of the seat 14. An operating lever 88 is connected to the valve 87 and extends upwardly in front of the seat 14. A short length of flexible conduit 86 connects the primary valve 85' with the control valve 87; and the latter is connected to each of the ram cylinders 81 through flexible conduits 89, the connection being made near the point of the ram's pivotal connection 83 with the tractor frame.

The primary valve has two functions; one to supply fluid under pressure to the secondary valve 87 where it can be distributed to either of the hydraulic rams 79 and 80, and the other to permit the return of fluid from the rams through the secondary valve. If it is desired to retain the pistons 82 of the rams 79 and 80 in a predetermined relative position thereto, the secondary valve 87 may be adjusted to a neutral position in which the valve blocks any movement of fluid to and from the rams. Thus it can be seen that the secondary valve 87 acts as a control valve to move or hold stationary either of the hydraulic rams 79 and 70 and that the primary valve acts as a motion selector, whereby the pistons 82 of the rams may be either moved inwardly or outwardly of their cylinders 81.

The lifting structures which are associated with, and depend from, the right hand and left hand bails 63 and 70 are mirror images of each other and it is thought that the complete and full description of one such structure will suffice to describe the other and fully explain the invention.

Figures 7, 8, 10, 11:
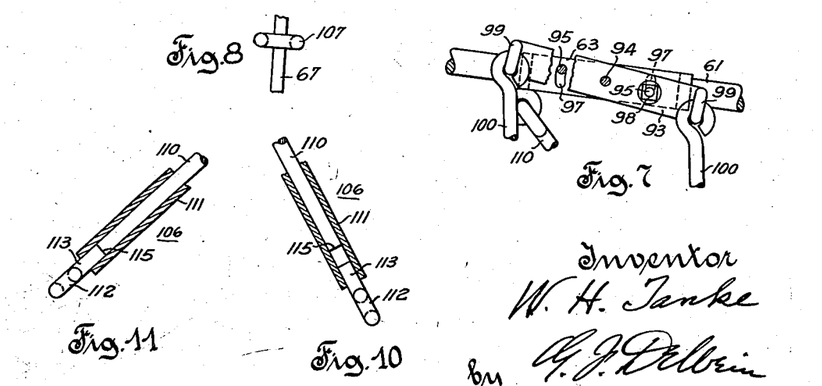
Fig. 7 is a detail view of a plow leveling member, a portion of which is broken away to expose part of the lifting bail structure.
Fig. 8 is a detail view of an eye of the lifting bail to which a contractable and extensible link is attached, the view being taken from below the bail when the plow is in ground entering position as shown in Fig. 2.
Fig. 10 is a detail view, in section, showing parts of the extensible and contractable link in a position occupied by the latter when the right hand plow is in ground working position, as shown in Fig. 3.
Fig. 11 is a detail view, in section, showing parts of a link similar to the one shown in Fig. 10, in a position occupied when the left hand plow is in a raised or transport position, as seen in Fig. 3.

The right hand bail 63 has abutting the outer surface of its central portion and extending transversely of the tractor a leveling or winging member 93, as best shown in Fig. 7, fastened through its center to the central portion of the bail by means of a pivotal connecting bolt 94. Spaced on either side of the centrally located connecting bolt 94 and transversely of the leveling member, are a pair of adjusting bolts 95 which pass respectively through apertures in the leveling member 93 to engage with a pair of vertically disposed slots 97 in the bail 63, as shown in Fig. 7. A nut 98 and lockwasher cooperate with each bolt to hold the leveling member 93 securely against the bail 63 in a predetermined angular relationship relative thereto which angularity is limited only by the length of the vertical slots 97 in the bail. In other words, the leveling member 93 is rotatable about the central connecting bolt 94 and may be adjusted angularly relative to the bail 63.

The ends of the leveling member 93 are respectively formed into eyes 99 which extend outwardly and rearwardly therefrom in relative parallel relation, and a pair of depending links 100 are looped, respectively, through the eyes 99. The links 100 are of equal length, and are freely swingable within the eyes 99 of the leveling member 93. They extend downwardly in parallel relation and are universally connected at their lower ends to a transversely disposed tool supporting member 101, the links 100 being looped at the lower ends through upwardly extending eyes 103, respectively, at the opposite ends of the tool supporting member 101. For purposes of definition the bail 63 and its associated leveling member 93 may be considered as constituting two rock arms, a first one comprising the outer leg 64 and the outer eye 99, and a second one comprising the inner leg 67 and the inner eye 99, and it will be seen that the two rock arms are swingable in unison about the axis of the shaft 61, and are spaced from each other axially of said shaft. The outer link 100 constitutes a raising and lowering means connecting the tool support or plow beam 17' with the first rock arm at a predetermined radial distance from the axis of the shaft 61.

The right hand plow beam 17', is connected rearwardly of its point of connection with the hitch bail 25, with the tool supporting member 101 in relatively close proximity to the inner eye 103 and at a substantial distance from the outer eye 103, a pair of U-bolts 104 passing around the beam fore and aft of the tool supporting member and engaging with a locking plate 105. Two nuts 105' and associated lockwashers respectively serve to hold the U-bolts 104 and locking plate 105 in place.

As heretofore mentioned, the lifting structure depending from the left hand bail 70 is a mirror-image of that depending from the right hand bail 63 and the following description which has reference to details of the right hand lifting structure is equally applicable to the left hand lifting structure, it being kept in mind that the structure at the left side of the tractor is an opposite hand duplicate of the one at the right side of the tractor.

Figures 3, 9:
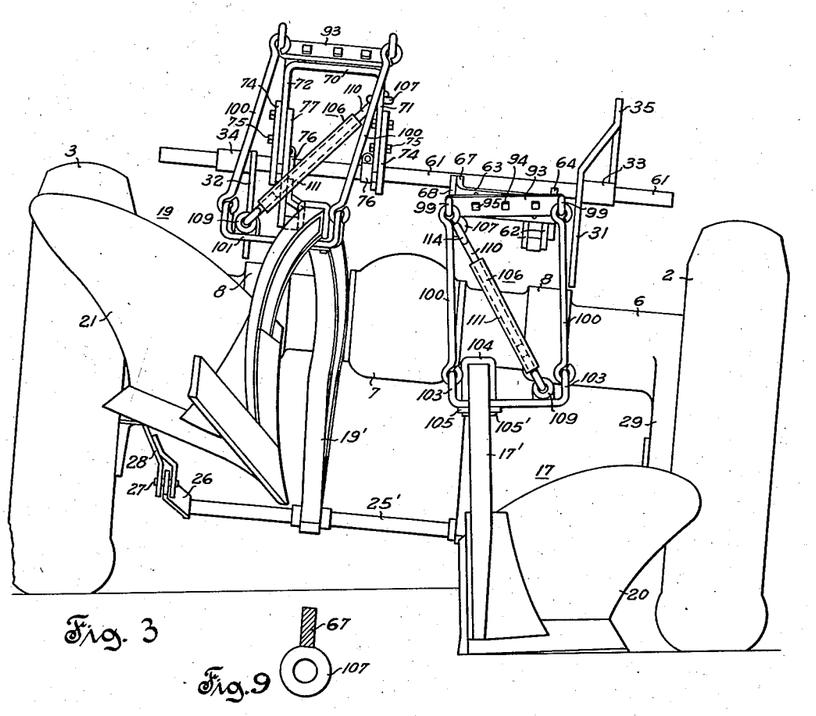
Fig. 3 is a rear view of the tractor operated two-way plow with the right hand plow in ground working position and the left hand plow in raised or transport position; a portion of the two-way plow's associated parts and a portion of the tractor being omitted for the sake of clarity.
Fig. 9 is a detail view of the eye shown in Fig. 8, the view being taken from the rear of the bail when the plow is in ground entering position as shown in Fig. 2.

When the hydraulic ram 79 is operated by admission of pressure fluid into the ram cylinder 81 the right hand plow 17 is moved from the working position in which it is shown in Fig. 3, to a laterally offset transport or inoperative position as illustrated by the position of the left hand plow 19 in the same figure. That is, while the plow 17 is swung upwardly about the horizontal axis of the shaft 25' of the hitch bail 25, it is simultaneously swung laterally on the pivot pin 58 in a direction towards the right tractor wheel 2. This result is accomplished by means of an extensible and contractable link 106, having coaxial slidable portions, which are shown in detail in Fig. 10, and the operation of which will be discussed more fully hereinbelow. The link 106 is universally connected at one end to an eye 107 (Figs. 8, 9) protruding from the underside of the inner leg 67 of the bail 63 at a point intermediate the shaft 61 and the loop of the bail, and at the other end the link 106 is universally connected to an outwardly and laterally disposed eye 109 of the tool supporting member 101. If reference is had to a rear view of the lifting mechanism as seen in Fig. 3, it will be noticed that the extensible and contractable link 106, or as it will be known hereafter, the telescopic link, lies in a diagonal position relative to the depending links 100, as seen along a line normal to the plane of the depending links and passing between them. It should be particularly noted that the radial distance measured from the rock shaft 61 along the inner leg 67 of the bail 63 to the point of connection between the latter and the telescopic link 106 is not equal to the radial distance measured from the shaft along the same leg to the point of connection between the adjacent end of the leveling member 93 and the upper end of the inner depending link 100.

The telescopic link 106 comprises a male element 110 and a female element 111, the latter adapted to receive the former in slidable engagement therewith and so constructed as to remain in substantially coaxial relation for any engaging position relative thereto.

The female element 111 consists of a hollow cylindrical member open at one end and closed at the other by means of an eye bolt 112 which is securely fastened thereto. The shank end 113 of the eye bolt 112 fits into and penetrates the bore of the element 111 for a short distance, as shown in Fig. 10. The coupling end of the eye bolt 112 is universally connected with the tool supporting member 101, as heretofore described. That is, the female element 111 is swingable lengthwise and transversely of the tool support or plow beam 17' at a point in laterally fixed relation to the latter and in spaced relation to the hitch point of the beam 17' on the shaft 25' of the hitch bail 25.

The male element 110 of the telescopic link 106 consists of a length of solid circular stock having a diameter slightly less than the diameter of the bore of the female element 111 so as to be slidably movable therein. One end of the male element 110 is bent to form an eye 114, as shown in Fig. 4, which is universally connected to the inner leg 67 of the bail 63, as heretofore mentioned, and the other end merely terminates to form a free end 115. The male element 110 is freely slidable, within limits in the female element 111, the limiting or telescoped position between the two elements being reached when the free end 115 of the male element abuts the closed end of the female element. In such a position further inward telescopic movement is impossible.

If reference is had to Fig. 10 which is a detail view of the relative positions of the male and female elements of the telescopic link 106 when the right hand plow 17 is in a ground working position, as shown in Fig. 3, it will be seen that the free end 115 of the male element 110 does not abut the closed end of the female element 111, the space between the two being clearly defined. It will be further noted with respect to the entire lifting structure, as shown in Fig. 3, that four of its parts: namely, the leveling member 93, the two depending links 100 and the tool supporting member 101, form a parallelogram and that the telescopic link 106 while not lying in the plane of the parallelogram is disposed diagonally relative to the latter and has its trace in a plane very nearly coincident with one of the diagonals of the parallelogram.

If the lowered or ground working plow 17 meets with an obstruction in the ground which tends to shift it laterally of the tractor the aforementioned parallelogram will assume a new shape compared with its configuration prior to the shift, and the telescopic link 106, because of its peculiar diagonal relationship with the parallelogram, will either be elongated or contracted depending on the direction of the lateral shift. Sufficient space is left between the two portions of the telescopic link 106 in order to allow for further inward telescopic movement if the shift is in a direction tending to foreshorten the link. It will be seen from the action described that the plow 17 is freely swingable laterally while in the ground and that the action of telescopic link 106 does not objectionably interfere with this lateral swinging motion.

If the plow 17 is now lifted out of the ground by elevating the right hand bail 63 so as to swing the bail and leveling member 93 in an arc about the axis of the rock shaft 61, it will be apparent that, as the angle between the leg 67 of the bail and the depending link 100 is decreased, the end points of the telescopic link 106 will begin to approach each other, and the distance as measured between the two points will begin to decrease. This contraction of the end points of the telescopic link 106 may be more readily visualized considering first the position of the lifting mechanism when the right hand plow 17 is resting in the ground, as shown in Fig. 3, and before the plow has started to move in an upward direction. In such a position, the inner leg 67 of the right hand lifting bail 63 extends rearwardly from the shaft 61 and in a slightly downwardly directed position, with the leveling member 93 in an angular relationship to the bail so as to level the plow 20. The depending links 100 extend in a substantially vertical plane. The telescopic link 106, as heretofore noted, is disposed diagonally relative to the parallelogram formed by the leveling member 93, associated depending links 100, and the tool supporting member 101; and it should again be recalled that the point of connection of the telescopic link with the bail 63 is at a radial distance from the shaft 61 different from the radial distance of the point of connection of the depending links with the leveling member.

For the purposes of explanation, the axis of the shaft 61, the axis on which the eyes 99 are alined, the axis on which the eyes 103 are alined, and the axis of the shaft 25' on the hitch bail 25 may be considered as the pivot axes of a quadrilateral link structure, best shown in Fig. 4, and it will be seen that one of the diagonals of said link structure, namely, the one between the axis of the shaft 61 and the axis on which the eyes 103 are alined, becomes shorter, and that the other diagonal, namely, the one between the axis of the shaft 25' and the axis on which the eyes 99 are alined, becomes longer when the bail 64 is swung upwardly from the mentioned position by rotation of the shaft 61. As a result, the telescopic link 106, whose relatively slidable elements are connected, respectively, with said quadrilateral link structure at points which tend to approach each other when the quadrilateral link structure changes its configuration due to the mentioned upward movement of the bail 63, is constantly subject to a contracting force during the lifting movement of the bail 63 from an initial starting position with the plow 17 in the ground to a final position with the plow in the air. But as heretofore described, the structure of the telescopic link 106 will not permit of its indefinite contraction during the elevation of the bail 63 and eventually a point is reached in the bail's upward movement when the male element 110 of the telescopic link abuts the closed end of the female element 111 and further contracting motion of the link is impossible. This point occurs shortly after the plow 17 is raised out of the ground and long before it reaches its transport position. When the lifting bail 63 reaches a position where the telescopic link 106 is no longer contractable, further upward movement of the bail will result in a lateral shifting movement of the plow 17 and tool supporting member 101 since the distance between the two end points of the telescopic link is now greater than the distance which would separate the points if the telescopic link were indefinitely contractable. The telescopic link 106 must be accommodated in the lifting structure between its two end point connections therewith and since during elevation of the lifting structure the telescopic link becomes in effect a non-contractable rigid member and its upper point of connection with the bail 63 cannot shift laterally, the lower point of connection with the tool supporting member 101 must move outwardly laterally to effect such accommodation.

From the foregoing description it will be seen that the male element 110 of the telescopic connection 106 cooperates with the second rock arm 67, 99 at a point on the latter which is spaced from the axis of the shaft 61 a different radial distance than the swinging center of the outer link 100 on the first rock arm 64, 99, and with the female element 111, to swing the latter lengthwise, that is rearwardly, and transversely, that is downwardly, relative to the plow beam 17' and to simultaneously force said female element in a direction to transmit side thrust to the plow beam 17', by swinging movement of said rock arms about the axis of the shaft 61.

The outward lateral shift of the tool supporting member 101 will swing the plow 17 laterally of its line of draft with the tractor and since it is moving vertically at the same time, it will be displaced upwardly and outwardly to a position opposed to that of the left hand plow 19, which is shown raised in Fig. 2. At the completion of this upward and outward movement relative to the tractor, the plow 17 will be retained in a final position, similar to the opposed position assumed by the left hand plow 19, by the rigid and no longer contractable telescopic link 106. Thus the inoperative plow is prevented from swinging inwardly while in the raised or transport position and the danger of such inward swinging damaging the two structures is avoided. This is of particular importance when the tractor is moving along the contours of a slope with the downhill plow in a ground engaging position and the uphill plow in a raised or transport position. Under the influence of gravity there is a tendency for the uphill plow to swing toward the downhill plow and interfere with the operation of the latter. In this invention the telescopic link 106 retains the raised plow against swinging inwardly toward the lowered or working plow and allows the lowered plow to be freely swingable laterally in its working position. Furthermore, the movement of the inoperative plow vertically and laterally of its operative position to a diagonally displaced transport position prevents the collection on the inoperative plow structure of grass mat and trailing vines which avoid the cutting action of the colter mounted ahead of the working plow and are thrown upward by the action of the plow bottom.

Referring to Fig. 4, a power takeoff drive shaft 116 extends rearwardly from the central portion 7 of the rear axle structure 6 and is drivingly connected with the tractor engine for rotation by the latter. Should it be desired to make use of the power takeoff in order to run some machine external to the tractor it is not necessary to disconnect the two-way plow attachment. The two plows 17 and 19 are merely raised to transport position and the space provided by the vertical and lateral displacement of the plows is adequate to permit a pulley drive or a shaft coupled drive to be fastened to the power takeoff shaft 116 and operated in a free and unobstructed manner.

In the operation of the two-way plow the driver sits upon the seat 14 of the tractor and by manipulation of first the primary valve 85' through the rod 92 and handle 91 and secondly the secondary valve 87 through its operating lever 88 he is able to alternately raise or lower the plows 17 and 19 or maintain them in any predetermined vertical position including the raised or transport position.

The two-way plow attachment is detachably connected to the tractor, and to effect the detachment thereof it is simply necessary to perform a few disconnecting operations herein now to be described, the plows 17 and 19 first being lowered into a ground engaging position. The plow beams 17' and 19' may then be detached from the hitch bail 25 by removing the vertical pivot pins 58 and moving the ends of the beams laterally out of the brackets 57. Next the pivot pin 80' which connects the hydraulic ram 80 with the lifting bail 70 is removed. The right hand bail 63 is disconnected from the rock shaft 61 by removing the bolts 65 and 69 securing it respectively to the depending arms 62 and the projecting lug 68. The left hand bail 70 is disconnected from the rock shaft 61 by removing the bolts 75 which secure the locking plates 74 to the bail legs 71 and 72 and disengaging the legs from their notched engagement with the shaft. The tractor may then be driven forwardly away from the plows 17 and 19 leaving the attachment on the ground as disconnected.

To connect the two-way plow attachment to the tractor, it is merely necessary to reverse the aforesaid procedure and drive the tractor rearwardly over the plows 17 and 19 until the tractor hitch 25 and the rear frame 13 are in a suitable position relative to the plow beams 17' and 19' to effect a hitch with the latter.

While in the foregoing a preferred embodiment of the invention has been described and shown as relating to two-way plows, it should be understood that it is not intended to limit the invention to two-way plows, and the invention might equally well be applied to one-way plows having a single plow beam. It should be further understood that it is not intended to limit the invention to the exact details of construction herein disclosed, because various modifications within the scope of the appended claims may occur to persons skilled in the art.

It is claimed and desired to secure by Letters Patent:

1. In a lift mechanism for agricultural implements; a rock shaft, first and second axially spaced arms mounted on said shaft, first and second depending links connected, respectively, to said arms at predetermined radial spacings from the axis of said shaft, a transverse member connected to said first and second depending links for lengthwise shifting movement axially of said shaft, a first link section universally swingable about a center on said second arm at a different radial spacing from the axis of said shaft than said second depending link, another link section universally swingable about a center fixed on said transverse member near the point of connection of said first depending link with said transverse member, said first and second link sections being connected with each other for relative movement in the direction of a line extending through said centers, and means to limit relative movement of said link sections, whereby rocking movement of said shaft will be effective to move said transverse member simultaneously lengthwise and vertically relative to said shaft.

2. In combination, a tractor, a plow beam having forward hitch connection with said tractor, and means for swinging said plow beam about said hitch connection comprising a transverse rock shaft mounted on the tractor, first and second axially spaced arms mounted on said shaft, first and second depending links connected, respectively, to said arms at predetermined radial spacings from the axis of said shaft, a transverse member connected with said plow beam and having connection with said first and second depending links for lengthwise shifting movement of said transverse member axially of said shaft, a first link section universally swingable about a center on said second arm at a different radial spacing from the axis of said shaft than said second depending link, another link section universally swingable about a fixed center on said transverse member near the point of connection of said first depending link with said transverse member, said first and second link sections having integral portions, respectively, cooperating with each other to guide said second link section on said first link section for sliding movement relative thereto in the direction of a line extending through said centers, and means to limit relative sliding movement of said link sections, whereby rocking movement of said shaft will be effective to move said transverse member and said plow beam simultaneously lengthwise and vertically relative to said shaft.

3. In an agricultural implement, a traveling support having a hitch point, a first rock arm swingable on said traveling support about an axis spaced from said hitch point, a second rock arm swingable about said axis in unison with said first rock arm and spaced from the latter longitudinally of said axis, a tool support universally connected with said traveling support at said hitch point and extending transversely of said axis, raising and lowering means connecting said tool support with said first rock arm at a point on the latter spaced a predetermined radial distance from said axis, an element swingable lengthwise and transversely of said tool support at a point in laterally fixed relation to the latter and in spaced relation to said hitch point, and another element cooperating with said second rock arm at a point on the latter spaced from said axis a different radial distance than said point on said first rock arm, and with said first mentioned element to swing the latter lengthwise and transversely of said tool support and to simultaneously force said first element in a direction to transmit side thrust to said tool support by swinging movement of said rock arms about said axis.

4. In an agricultural implement, a traveling support having a hitch point, a first rock arm swingable on said traveling support about an axis spaced from said hitch point, a second rock arm swingable about said axis in unison with said first rock arm and spaced from the latter longitudinally of said axis, a tool support universally connected with said traveling support at said hitch point and extending transversely of said axis, raising and lowering means connecting said tool support with said first rock arm at a point on the latter spaced a fixed radial distance from said axis, and means for swinging said tool support laterally about said hitch point, comprising a first link section pivotally connected with said second rock arm at a different radial spacing from said axis than said point on said first rock arm, a second link section swingable lengthwise and transversely of said tool support about a pivot center in laterally fixed relation to the latter and in spaced relation to said hitch point, said first and second link sections being connected with each other for relative movement in the direction of a line extending through their respective pivot centers, and a stop on one of said link sections engageable by the other for limiting said relative movement of said link sections.

5. In an agricultural implement, a traveling support having a hitch point, a rockable structure comprising a first rock arm swingable on said traveling support about an axis spaced from said hitch point and a second rock arm swingable about said axis in unison with said first rock arm and spaced from the latter longitudinally of said axis, a tool support connected with said traveling support at said hitch point and extending transversely of said axis, raising and lowering means connecting said tool support with said first rock arm at a point on the latter spaced a predetermined radial distance from said axis, an element swingable lengthwise and transversely of said tool support at a point in laterally fixed relation to the latter and in spaced relation to said hitch point, and another element cooperating with said second rock arm at a point on the rockable structure spaced from said axis a different radial distance than said point on said first rock arm, and with said first mentioned element to swing the latter lengthwise and transversely of said tool support and to simultaneously force said first element in a direction to transmit side thrust to said tool support by swinging movement of said rock arms about said axis.

6. In an agricultural implement, a traveling support having a hitch point, a rockable structure swingable on said traveling support about an axis spaced from said hitch point, a tool support connected with said traveling support at said hitch point and extending transversely of said axis, means connecting said tool support with said rockable structure at a first point on the latter spaced a predetermined radial distance from said axis, an element swingable lengthwise and transversely of said tool support at a point in laterally fixed relation to the latter and in spaced relation to said hitch point, and another element cooperating with said rockable structure and with said first mentioned element to swing the latter lengthwise and transversely of said tool support and to simultaneously force said first mentioned element in a direction to transmit side thrust to said tool support by swinging movement of said rockable structure about said axis, said second mentioned element being connected with said rockable structure at a second point on the latter spaced from said axis a different radial distance than said first point and also spaced from a plane extending at right angles to said axis through said first point.

WILLARD H. TANKE.